UNITED STATES PATENT OFFICE.

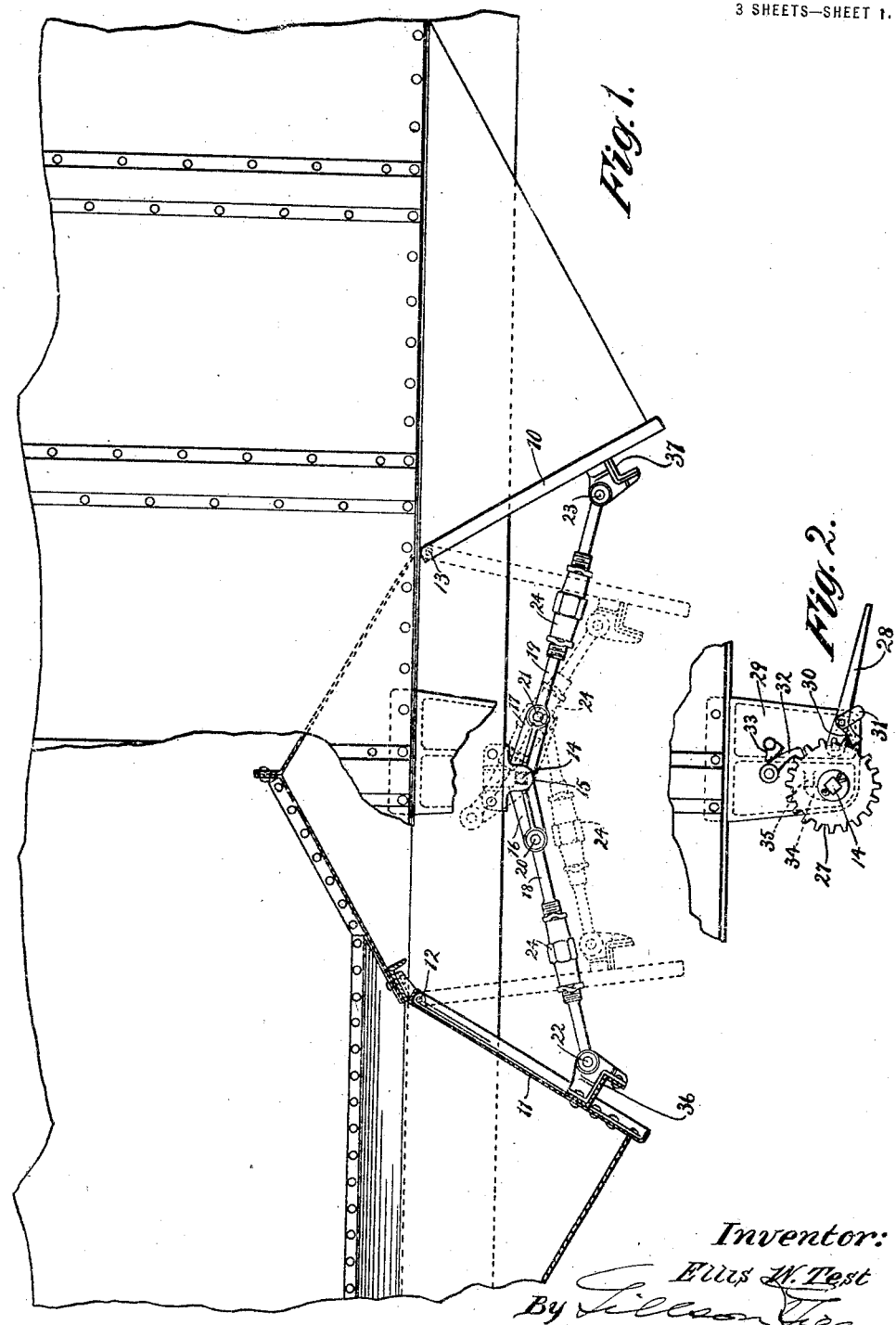

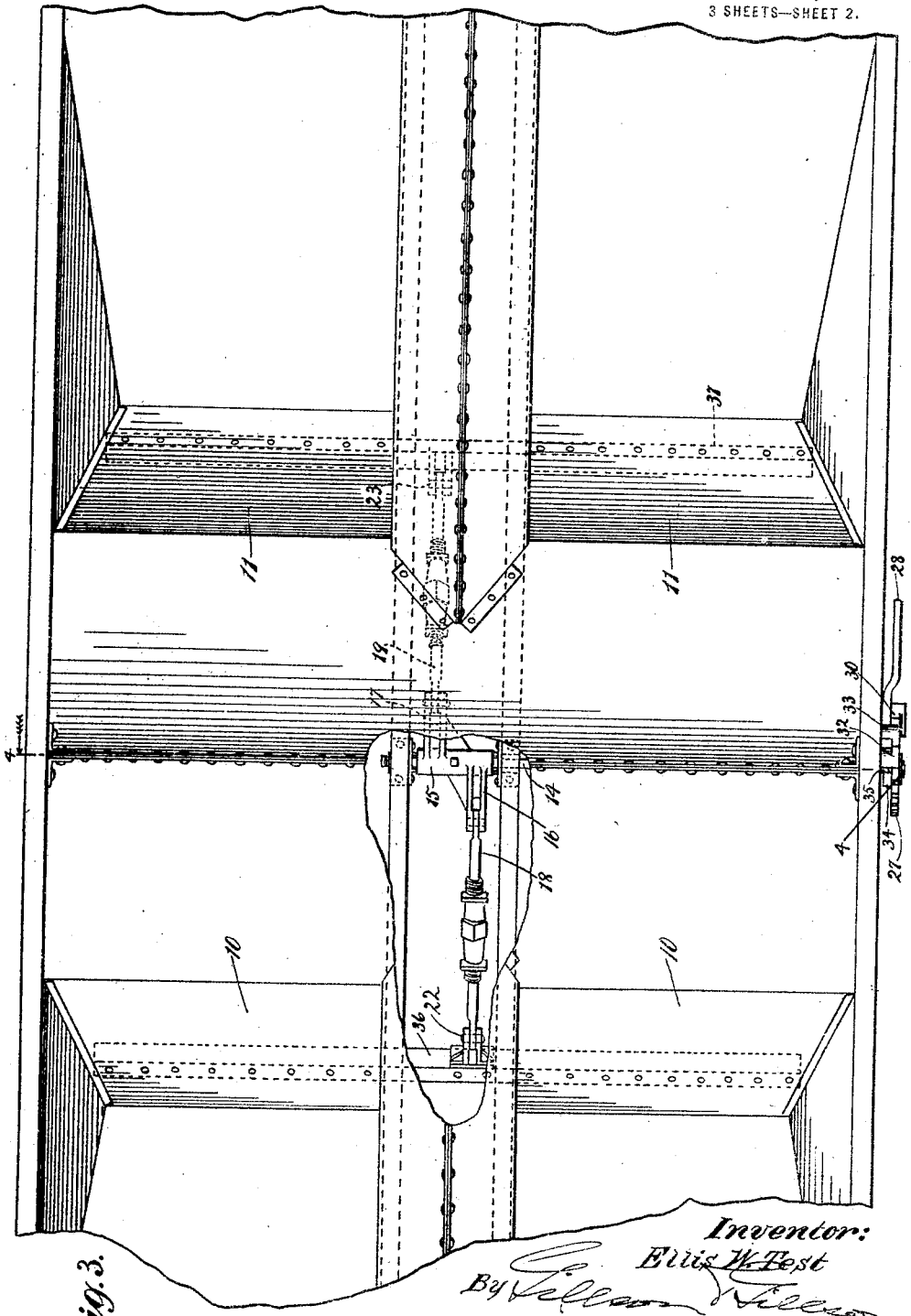

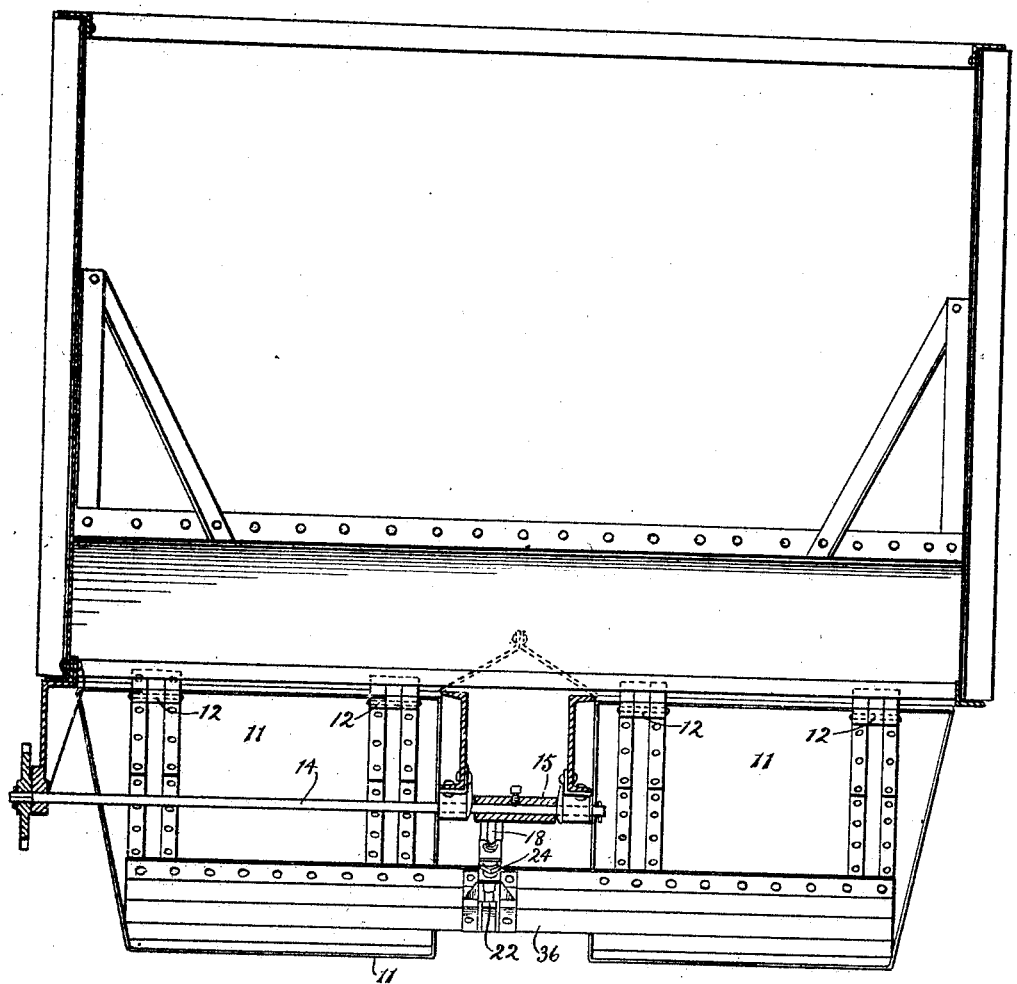
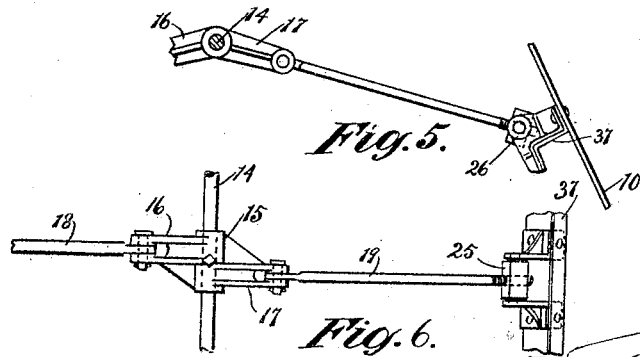

ELLIS W. TEST, OF MICHIGAN CITY, INDIANA.

DUMP-CAR.

1,368,372.  Specification of Letters Patent.  Patented Feb. 15, 1921.

Application filed June 10, 1919. Serial No. 303,053.

*To all whom it may concern:*

Be it known that I, ELLIS W. TEST, a citizen of the United States, and resident of Michigan City, county of La Porte, and State of Indiana, have invented certain new and useful Improvements in Dump-Cars, of which the following is a specification, and which are illustrated in the accompanying drawings, forming a part thereof.

The object of the invention is the provision of a means for controlling the doors of a dump car which shall be simple and effective.

In the accompanying drawings;

Figure 1 is a detail side view partly broken away, illustrating the invention,

Fig. 2 is a detail side view of the shaft controlling means,

Fig. 3 is a detail plan view partly broken away,

Fig. 4 is a detail section on line 4—4 of Fig. 3,

Fig. 5 is a detail elevation, and

Fig. 6 is a detail plan of a modification.

In the embodiment of the invention chosen for purposes of illustration the doors of the dump car are shown at 10 and 11, pivoted to swing about axes 13 and 12. It will be noted that the doors, as shown, are mounted to swing toward a common plane and that a shaft, as 14, is journaled in this plane. Upon this shaft a sleeve, as 15, is rigidly secured and cranks 16 and 17, are rigidly secured to the sleeve. Obviously cranks 16 and 17 might be secured to the shaft in various ways, but the form shown is at present preferred.

Links 18 and 19, each rendered extensible by means of a turn buckle 24, are shown as pivotally secured to the cranks at 20 and 21 at one end and to the doors, as at 22, 23 at the other end of the link.

In the modification of Figs. 5 and 6, the adjusting means for length of the links comprises a block, as 25, threaded upon the end of the link and after adjustment thereon, secured in the pivoting means, as 26, upon the door. The modification of Figs. 5 and 6 otherwise will not differ from that of Figs. 1 to 4.

It will be noted that the length of each link and crank is such that when the door is closed these parts will lie in a straight line connecting the center of shaft 14 with the pivot connecting the link with the door. To cause rotation of shaft 14 and therefore movement of links 16 and 17, there is shown a ratchet wheel 27, more plainly shown in Fig. 2. A lever 28 is pivoted upon the bracket 29 in which bracket the end of shaft 14 is journaled and this lever carries a reversible pawl 30 and a weighted projection 31, which, in the position shown in Fig. 2, tends to keep the pawl in contact with the gear.

To prevent movement of the shaft in a direction to open the doors there is provided a pawl 32 and for the purpose of locking this pawl in its depressed position, a cam 33 is pivoted adjacent the pawl. When the doors are in the closed position shown in Fig. 1, a slight motion of rotation of shaft 14 will be sufficient to "break" the toggle formed by cranks 16 and 17 and their respective links 18 and 19, when pressure of the material in the car upon doors 10 and 11 will cause a continued rotation of the shaft; and the links and cranks, as well as the doors, will assume the position shown in dotted lines in Fig. 1, allowing the material in the car to be discharged.

The doors may be closed by repeated oscillations of lever 28 with the pawls in the position shown in Fig. 2, but with the pawl lock 33 swung out of the way, pawl 32 preventing the return of the doors by gravity. When ratchet 27 has revolved sufficiently to fully close the doors, stop 34 revolving with the shaft 14 will come into contact with stop 35 carried by bracket 29 and prevent cranks 16 and 17 passing beyond the position shown in Fig. 1. If the parts were allowed to pass beyond the position shown in this figure the doors would be opened in the same manner as that shown by the dotted lines except that the cranks would have revolved in the opposite direction with the shaft 14.

In the embodiment shown the closing means is pivoted to the doors through the medium of Z-bars 36, 37, which bars are each connected to two doors, the door closing means taking effect midway between the doors. Obviously a crank and link could be supplied for each door, making four toggles for the car of the type illustrated in the drawings, or if, for any reason, it seemed preferable, a plurality of toggles could be provided for each door.

The invention is shown as applied to a type of dump cars in which the doors swing longitudinally of the car. The device would work equally well with a car in which the doors swing transversely thereof. The tendency of vibration of the parts during movement of the car to jar crank 16 toward an opening position and to break the toggle from its straight line will be neutralized by the tendency of crank 17 and link 19 to jar downwardly, which would be in the closing direction for this toggle. Therefore, this tendency of the toggles to be broken by the jar neutralizes each other and is moreover prevented by action of stops 34, 35, and locking of pawl 32 in contact with ratchet 27 by means of cam 33.

The embodiment of the invention shown is chosen merely for purposes of illustration, it being obvious that many changes might be made in the details thereof without departing from the spirit of my invention.

I claim as my invention:

In a dump car, in combination, a pair of doors mounted to swing about horizontal axes toward a common plane, a shaft journaled in said plane, a sleeve secured to said shaft, a pair of cranks integral with said sleeve, and longitudinally offset thereon, links pivoted to said doors and to said cranks forming toggles of such proportions that the doors are closed when the toggles are straight, means to rotate said shaft, stop means to limit said rotation at the position where the toggles are straight and means to lock the shaft against rotation.

ELLIS W. TEST.